Oct. 8, 1957 R. BELLMANN 2,808,741
ROTARY TABLE, PARTICULARLY FOR MACHINE TOOLS
Filed June 21, 1954 4 Sheets-Sheet 3

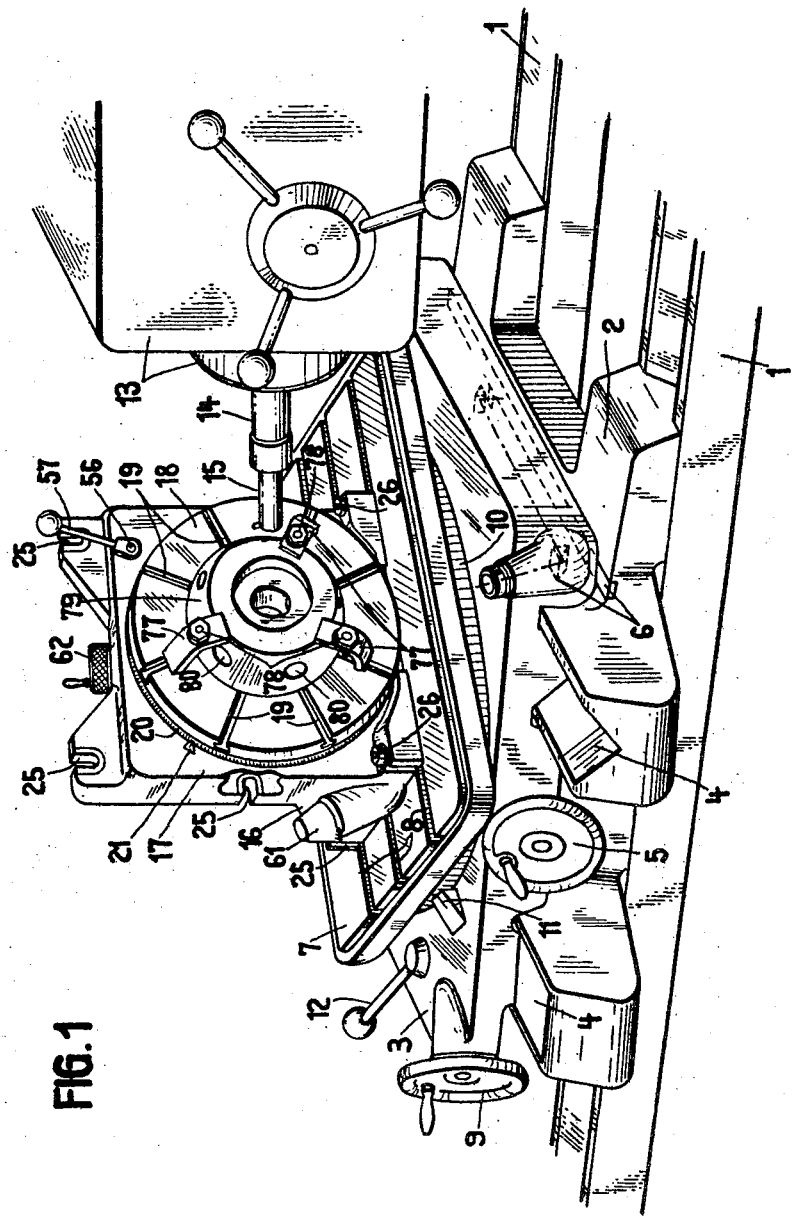

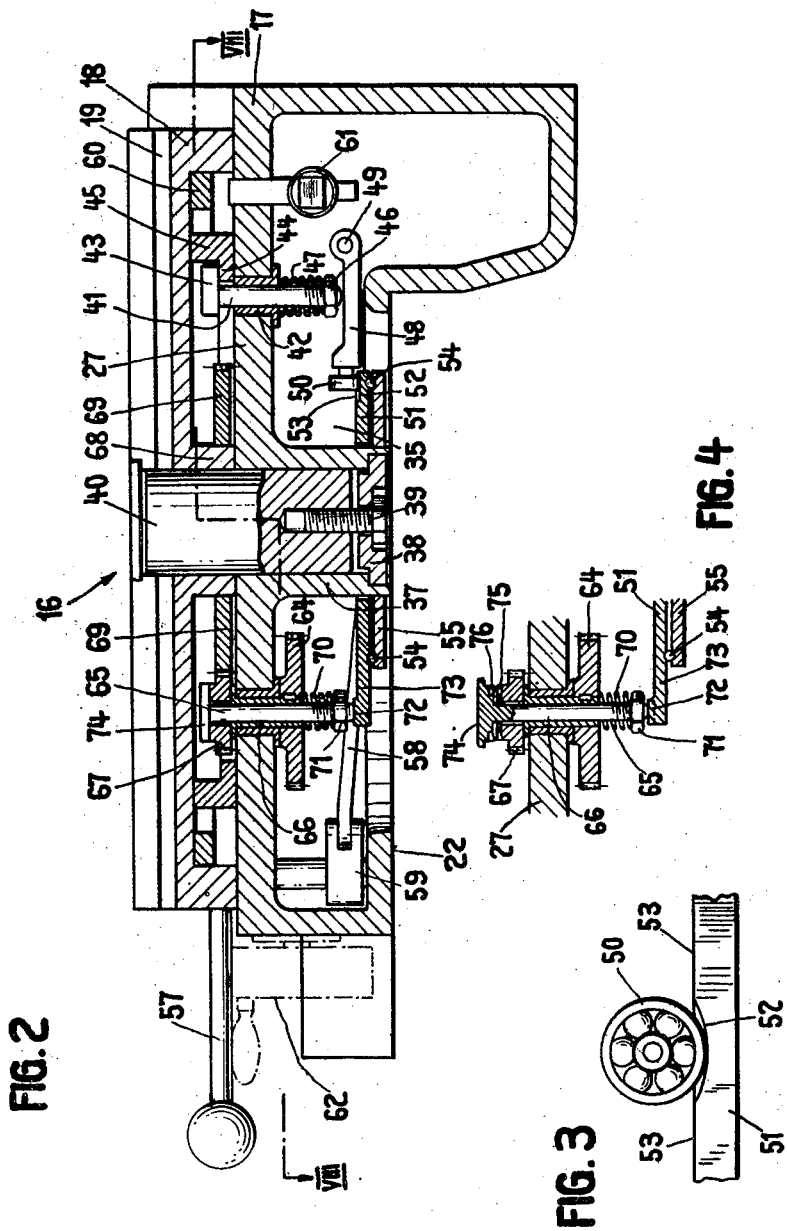

INVENTOR
REINHOLD BELLMANN
BY
ATTORNEY

Oct. 8, 1957   R. BELLMANN   2,808,741
ROTARY TABLE, PARTICULARLY FOR MACHINE TOOLS
Filed June 21, 1954   4 Sheets-Sheet 4
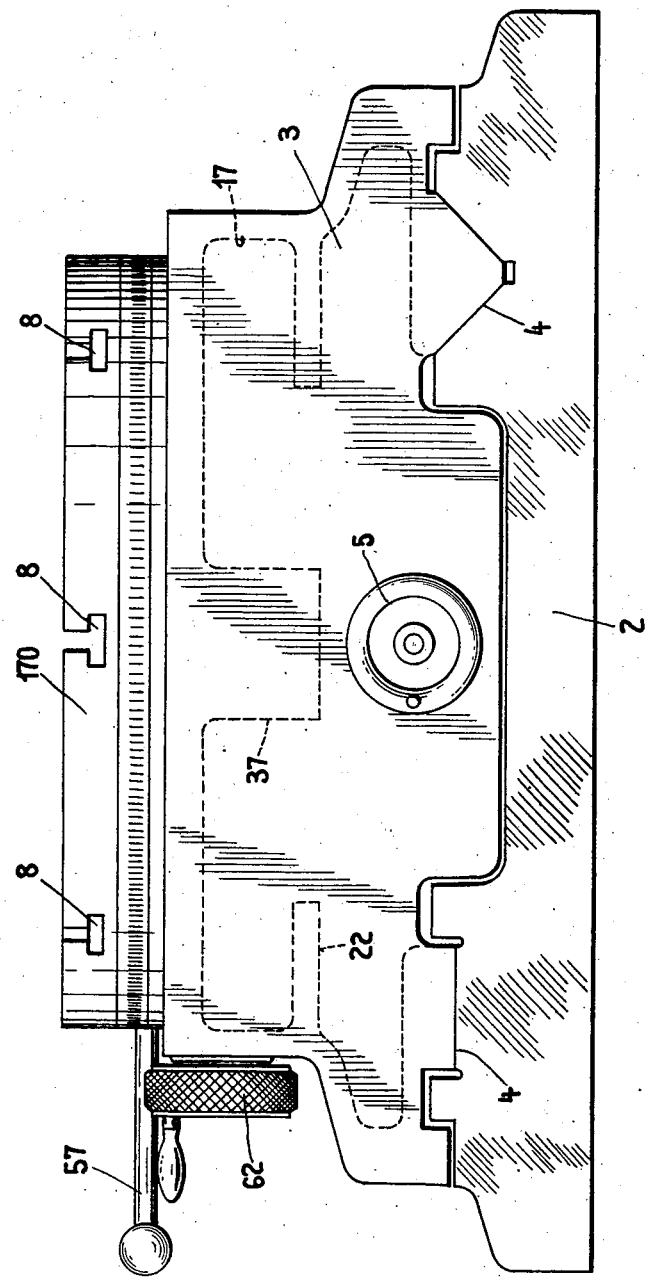
INVENTOR
REINHOLD BELLMANN
BY
ATTORNEY

United States Patent Office 2,808,741
Patented Oct. 8, 1957

2,808,741

ROTARY TABLE, PARTICULARLY FOR MACHINE TOOLS

Reinhold Bellmann, Le Locle, Switzerland, assignor to Dixi S. A., Le Locle, Switzerland Application June 21, 1954, Serial No. 438,227

Claims priority, application Switzerland July 2, 1953

5 Claims. (Cl. 74—824)

This invention relates to a rotary table which can alternately be clamped, released and finely adjusted and which is particularly used in machine tools such as, for instance, horizontal boring and milling machines, dividing or indexing machines and the like.

Prior rotary tables of that kind comprise separate control means for clamping and releasing the table and for the fine adjusting device, one of these control means, such as a lever or the like, serves for clamping and releasing, and the other control means, for instance, for swinging a worm of the fine adjusting device into and out of engagement. These prior solutions are uncomfortable in manipulation and injurious to accuracy.

The above-mentioned and other inconveniences are done away with by the invention in that the rotary table according to the invention has only one control means, e. g., a control lever serving both for clamping and releasing the rotary table and for engaging and disengaging the fine adjusting device. Due to the invention it is also possible to clamp the rotary table exclusively by springs so that no force components in the rotary plane of the table occur. Moreover, due to the springs the clamping pressure is uniformly distributed.

The rotary table according to the invention may for instance be used in a machine as a rotary machine table and/or as a top or set up table or the like.

Other objects and features will be apparent as the following description proceeds, reference being had to the accompanying drawings illustrating by way of example one embodiment of the invention, and in which:

Fig. 1 is a perspective view of some parts of a horizontal precision boring and milling machine, and of an auxiliary table attachment temporarily mounted on the rotary machine table.

Fig. 2 is a vertical section of the auxiliary attachment through the rotary axis of its rotary table.

Fig. 3 illustrates an antifriction bearing and a control surface cooperating with the bearing, these means belonging to a mechanism controlling the clamping device for the rotary table of the auxiliary attachment.

Fig. 4 is an axial sectional view of a modified device controlling the fine adjustment drive for the rotary table of the auxiliary attachment, Fig. 6 is a side elevation of a rotary machine table according to the invention.

Figure 5:
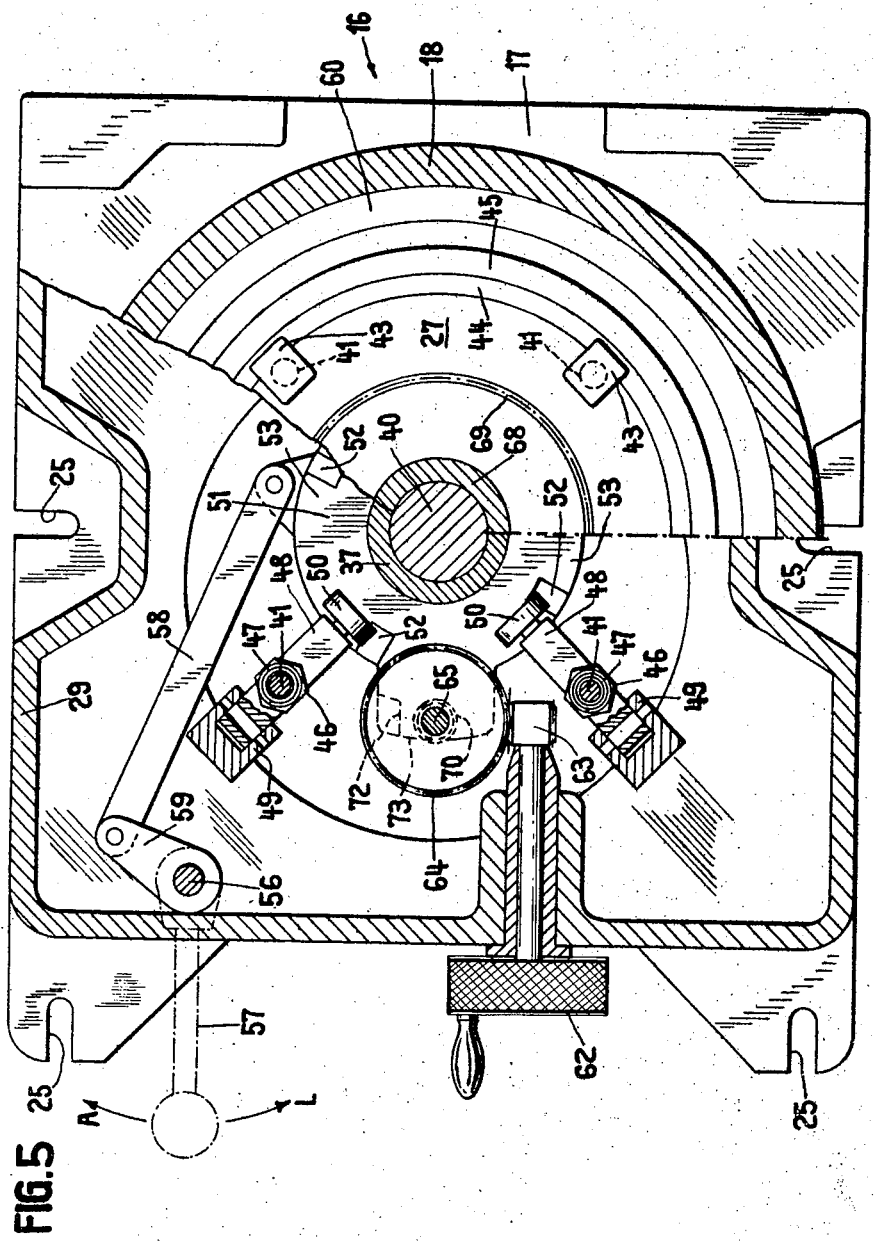
Fig. 5 is a sectional view taken along the line VIII—VIII of Fig. 2.

Fig. 1 shows the compound slide of the horizontal boring and milling machine, which is adjustable along the machine bed 1 and comprises the well-known longitudinal slide 2 and the carriage 3. An optical reading means 6 serves for fine adjustment of the carriage 3 along the guideways 4 of the longitudinal slide 2 by means of the handwheel 5. The rectangular rotary machine table 7 having grooves 8 for clamping fast a workpiece or pieces is pivoted on the carriage 3 in a well-known manner and can be turned in a horizontal plane by means of a handwheel 9 mounted on the carriage 3. A circular scale 10 on the table 7 cooperates with a mark 11 of the carriage 3. Besides the adjustment means 10, 11 an optical means (not shown) may be provided for adjusting the angular position of the rotary machine table 7, such as for instance a precision rule which may be read by means of a microscope or projected onto an image screen. Control lever 12 pivoted on the carriage 3 serves for clamping fast the table 7 after angular adjustment of the latter. The tool 15 is fixed to the rotary hollow spindle 14 which is journalled on the drill head 13 of the machine and surrounds the axially adjustable drill spindle (not shown). The above-described parts of a horizontal boring and milling machine and their structural arrangement and interrelation are well known to those skilled in the art and, therefore, need no further detailed description and illustration.

An auxiliary set up or top attachment 16 is provided to be temporarily clamped to the rotary machine table 7 either in an upright or vertical position or in a horizontal position. The auxiliary attachment is designed in accordance with applicant's copending patent application of even date, Serial Number 438,226, bearing the title "Top table with a rotary plate, particularly for use in machine tools." The attachment 16 has a casing 17 of rectangular shape in plan view, and a circular rotary table 18 journalled on the casing 17 and provided with clamping grooves 19 and an outer circular graduation or division 20 cooperating with a mark 21 of the casing 17 for coarse hand adjustment of the angular position of the rotary table 18.

The casing 17 has laterally open slots 25 to receive clamping or holding-down bolts 26 held in a well-known manner in the grooves 8 of the machine table 7, the attachment 16 being clamped by the bolts 26 to the machine table 7 in the position desired for the operation or operations to be done.

In order to obtain a suitable rotary mounting of the table 18 on the attachment casing 17 a bearing or collar 37 integral with the plate 27 extends from the latter through the hollow space 35 down to the level of the front face 22 of the casing 17. A turning pin 40 is journalled in the bearing 37 and is held in axial direction by means of a disc 38 and a bolt 39. The rotary table 18 is fixedly secured to the turning pin 40.

In order that the table 18 may also be useful for precision work, the following provisions are taken to satisfactorily clamp the rotary table 18 after its adjustment to the desired angular position, that is, to provide for the clamping effect withstanding all the forces applied to the workpiece during machining and to avoid any change of the adjusted angular position of the top table by the clamping operation.

For that purpose, clamping bolts 41 (e. g. two, three or more bolts) distributed on an imaginary circle around the pin 40 are guided for axial movement in sleeves 42 of the casing plate 27 and are parallel to the axis of rotation of the table 18 (Figs. 2 and 5). The bolts 41 comprise shoes 43 lying above a flange 44 of a ring 45 fixed to the rotary table 18. An adjustable compression spring 47 of for instance about 500 kilograms elastic force is inserted between the flange of each sleeve 42 and an adjusting nut 46 of the respective bolt 41 and presses the bolt 41 in the direction towards a lever 48 pivoted on the casing 17 as at 49. The lever 48 of each bolt 41 is disposed in such a way that it transmits its force to the bolt 41 only in the axial direction of the latter. The free end of each pivoted lever 48 carries an antifriction bearing 50 (see also Fig. 3) engaging a rotary control disc 51 coaxial to the rotary table 18. The control disc 51 comprises depressions 52 and even surface portions 53 lying at a higher level than the depressions 52. The control disc 51 is rotatably supported by means of antifriction bodies 54 such as rolls or balls running on a thrust plate 55 fixed to the bearing 37, and is linked by means of a rod 58 and an intermediate lever 59 to a control lever 57 accessible from the outside and pivoted on the casing 17 as at 56. If the control disc 51 is turned around the rotary axis of the table 18 by means of the control lever 57 so that the antifriction bearings 50 engage the depressions 52, the pivoted levers 48 are in their lowermost position and the shoes 43 are pressed only by their springs 47 against the inner front face of the flange 44 and clamp the rotary table 18 fast in its adjusted angular position. In this clamped position the bolts 41 do not contact their levers 48. Since the springs 47 exert only forces vertical to the rotary plane of the table 18 and since there is no positive connection between the bolts 41 and their control means, clamping the rotary table 18 is obtained without any force component in the rotary plane of the table 18, which could change the position of the plate by a small amount during the clamping operation. Since clamping is only effected by means of springs 47, the clamping pressure is also uniformly distributed on all bolts 41. The levers 48 merely serve for releasing the rotary table 18. The antifriction bodies 54 and bearing 50 considerably facilitate the operation of the clamping device relatively to the well-known constructions comprising eccentrics, threading, worm gears etc.

For increasing the indexing or dividing accuracy and for maintaining the same over a long period, the attachment 16 with the table 18 is provided with an optical indexing or dividing attachment comprising an inner annular precision rule 60 fixed to the rotary table 18 and readable from the outside by means of a microscope 61 (Figs. 1 and 2). In another performance means may be provided for projecting the rule 60 onto an image screen. For turning the rotary table 18 on an optical fine adjusting operation, the following simple device is provided (Figs. 2 and 5): The shaft of the fine adjusting handwheel 62 (Figs. 1 and 5) rotatably mounted on the casing 17 carries a worm 63 engaging a worm wheel 64 keyed on a sleeve 66 loosely rotatable about a bolt 65 whose axis is parallel to the rotary axis of the table 18 (Figs. 2 and 5). A gear wheel 67 loosely arranged on the bolt 65 is permanently in mesh with a gear wheel 69 rigidly fixed to the hub 68 of the rotary table 18. The axially adjustable bolt 65 is under the influence of a compression spring 70 of, e. g., about 5 kilograms elastical force, which may be adjusted by means of a nut 71 of the bolt 65. In Fig. 2, the bolt 65 under the constraint of the spring 70 bears against a lobe 72 of a radially projecting lug 73 of the control disc 51 so that the bolt 65 is in lifted position and the gear wheel 67, on a coarse hand adjustment of the rotary table 18, turns idly with the gear wheel 69, while the worm wheel 64 is at rest. When the control lever 57 is moved to the fine adjusting position it turns the control disc 51 in such a direction that the lobe 72 comes out of reach of the bolt 65 and the spring 70 pushes the bolt 65 towards the bottom so that the flange 74 of the bolt 65, which does now not contact the lug 73, presses the gear wheel 67 tightly against the flange of the sleeve 66. Now, by turning the handwheel 62, the gear wheel 67 is taken along by the sleeve 66 by frictional effect and, therefore, the rotary table 18 is turned by the wheel 69 in accordance with the angular movement of the handwheel 62. For disengaging the fine adjusting drive the control lever 57 is adjusted until the lobe 72 lifts the bolts 65 against the constraint of the spring 70.

In the modified fine adjusting drive shown in Fig. 4, the gear wheel 67 is not taken along by the sleeve 66 by frictional effect. The gear wheel 67 has crown teeth 75 engageable with and disengageable from crown teeth 76 of the flange 74 by axial adjustment of the bolt 65. The bolt 65 has a key (not shown) running in an axial groove (not shown) of the sleeve 66, so that the bolt is axially adjustable, but taken along in rotation by the sleeve 66. The remaining system of the fine adjusting drive of Fig. 4 is the same as in Fig. 2. In Fig. 4 the engaging force is, as in Fig. 2, only given by the spring 70 acting vertically to the rotary plane of the table 18 so that the control lever 57 can be operated in any position of the rotary table 18, that is, also when the tips of the crown teeth 75 contact the tips of the crown teeth 76.

However, the bolt 65 may, similar to the bolts 41, be controllable by the disc 51 with the aid of a pivoted lever.

Referring to Fig. 2, the springs 47 and 70 and their control means such as the parts 48, 51, 58, 59 with the exception of the control lever 57 lie within the hollow space or chamber 35.

On the control lever 57 being in its mid-position as shown in Fig. 5, the antifriction bearings 50 contact the surface portions 53 of the control disc 51 and the bolt 65 is out of reach of the lobe 72. Therefore, the rotary table 18 is not clamped and the fine adjusting drive is engaged and fine adjusting by means of the handwheel 62 can take place. On adjusting now the lever 57 in the direction of the arrow A (Fig. 5), the depressions 52 of the control disc 51 come within reach of the antifriction bearings 50 and the levers 48 turn towards the bottom and the shoes 43 clamp the rotary table 18 fast under the influence of the springs 47. The bolt 65 is still out of reach of the lobe 72 and the fine adjusting drive remains engaged. On moving now the control lever 57 back to its mid-position, the rotary table 18 gets again unclamped. On adjusting the control lever 57 from its mid-position in the direction of the arrow L (Fig. 5) the antifriction bearings 50 remain on the surface portions 53 and the rotary table 18 remains unclamped. However, the bolt 65 comes now in reach of the lobe 72 and the gear wheel 67 is disengaged from the worm wheel 64 so that the fine adjusting drive is uncoupled and the rotary table 18 is freely rotatable such as, for instance, by hand. On returning the control lever 57 to its mid-position the fine adjusting drive is again engaged while the rotary table 18 remains unclamped.

As described and shown, only one control lever 57 is provided for both clamping and releasing the rotary table 18 and engaging and disengaging the fine adjusting device.

Referring now to Fig. 1, the attachment 16 is shown in its upright or vertical position. A workpiece 79 is fixed to the rotary table 18 by means of clamps 77 and bolts 78 engaged in the grooves 19 of the table 18. On the workpiece 79 boreholes 80 are to be made, whose axes lie on an imaginary conical surface with its axis coinciding with the rotary axis of the table 18. For drilling the bore-holes 80 by means of the tool 15 the machine table 7 with the attachment 16 clamped to it has previously been turned by the desired angle relatively to the spindle 14 in a horizontal plane by means of the handwheel 9 and the dividing means 10, 11. This done, only the rotary table 18 must be turned from one bore-hole 80 to another.

Fig. 6 illustrates a table 170 rotatably mounted on the carriage 3, which can be clamped, released and engaged for fine adjustment in the same manner as described and shown for the rotary table 18 of the attachment 16 in the former example. If need be, an auxiliary attachment of the kind of the first embodiment may be clamped to the machine table 170. In Fig. 6 the control lever 57 of Figs. 2 and 5 is substituted for the control lever 12 of Fig. 1, and the handwheel 62 of the former example for the handwheel 9 of Fig. 1, lever 57 and handwheel 62 being mounted on the carriage 3. The machine table 170 which may be cornered or circular, may be pivotally mounted on the carriage 3 exactly in the same manner as has been shown in Fig. 2 for the rotary table 18 on the casing 17 by means of the pin 40.

Also the arrangement of the clamping bolts 41 with their springs 47 and pivoted levers 48 and of the control and drive means for the fine adjustment of the table 170 and their control by means of a control disc 51 mounted on antifriction bodies 54 and by means of the control lever 57 may be chosen as in Figs. 2 to 5 with the difference that the attachment casing 17 is replaced by the hollow carriage 3 having an opening at the bottom. Also the optical reading means 60, 61 may be used. Therefore, illustrating in Fig. 6 the carriage 3 in section and showing therein all the parts and means of Figs. 2 to 5 (with the exception of the casing 17) has been dispensed with, as it would merely mean a repetition.

I claim:

1. In a table arrangement, a support having a hollow space, a rotary table rotatably mounted on said support, a thrust plate in said hollow space, fixed to said support, antifriction members engaging said thrust plate, a control disc in said hollow space, comprising a cam lug and being supported on said antifriction members to be rotatable about the rotary axis of said rotary table, a lever in said hollow space, articulated on said support, an antifriction bearing mounted on said lever and engaging said control disc, an axially adjustable clamping pin controllable for axial movement by said lever, arranged to temporarily clamp fast said rotary table on said support and mounted on said support with its axis parallel to the rotary axis of said rotary table, a spring within said hollow space, engaging said clamping pin to act on the latter parallel to the rotary axis of said rotary table for holding said clamping pin engaged with said rotary table in clamping position, a disengageable fine adjustment drive for said rotary table, arranged partly within said hollow space, comprising an axially adjustable coupling pin controllable for axial movement by said cam lug and mounted on said support with its axis parallel to the rotary axis of said rotary table, a coupling spring within said hollow space, engaging said coupling pin to act on it parallel to the rotary axis of said rotary table to bring said disengageable fine adjustment drive into engaged condition, an intermediate lever in said hollow space, swingingly mounted on said support, a link in said hollow space, connected with said control disc and with said intermediate lever, and a control lever in fixed connection with said intermediate lever, manually operable from the outside alternately into, a position for having said rotary table released and said disengageable fine adjustment drive in engaged condition, a position for having said rotary table clamped fast and said disengageable fine adjustment drive in engaged condition, and a position for having said rotary table released and said disengageable fine adjustment drive in disengaged condition.

2. In a table arrangement, a support having a hollow space, a rotary table rotatably mounted on said support, a thrust plate in said hollow space, fixed to said support, antifriction members engaging said thrust plate, a rotary control disc in said hollow space, supported on said antifriction members to be rotatable about the rotary axis of said rotary table, a transmission member in said hollow space, articulated on said support, an antifriction means mounted on said transmission member and engaging said control disc, an axially adjustable clamping member controllable by said transmission member for axial movement, arranged to temporarily clamp fast said rotary table on said support and mounted on said support with its axis parallel to the rotary axis of said rotary table, a spring within said hollow space, engaging said clamping member to act on the latter parallel to the rotary axis of said rotary table for holding said clamping member engaged with said rotary table in clamping position, a disengageable fine adjustment drive for said rotary table, arranged partly within said hollow space, comprising an axially adjustable coupling member controllable for axial movement by said control disc and mounted on said support with its axis parallel to the rotary axis of said rotary table, a coupling spring within said hollow space, engaging said coupling member to act on it parallel to the rotary axis of said rotary table to bring said disengageable fine adjustment drive into engaged condition, an intermediate member in said hollow space, swingingly mounted on said support, a connection member in said hollow space connected with said control disc and with said intermediate member, and a control member in fixed connection with said intermediate member, manually operable from the outside alternately into, a position for having said rotary table released and said disengageable fine adjustment drive in engaged condition, a position for having said rotary table clamped fast and said disengageable fine adjustment drive in engaged condition, and a position for having said rotary table released and said disengageable fine adjustment drive in disengaged condition.

3. In a table arrangement, a support, a rotary table rotatably mounted on said support, a thrust means in fixed relation with said support, antifriction members engaging said thrust means, a rotary control disc supported on said antifriction members to be rotatable about the rotary axis of said rotary table, a transmission member articulated on said support, an antifriction means mounted on said transmission member and engaging said control disc, an axially adjustable clamping member controllable for axial movement by said transmission member, arranged to temporarily clamp fast said rotary table on said support and mounted on said support with its axis parallel to the rotary axis of said rotary table, a spring engaging said clamping member to act on the latter parallel to the rotary axis of said rotary table for holding said clamping member engaged with said rotary table in clamping position, a disengageable fine adjustment drive for said rotary table, comprising an axially adjustable coupling member controllable for axial movement by said control disc and mounted on said support with its axis parallel to the rotary axis of said rotary table, a coupling spring engaging said coupling member to act on it parallel to the rotary axis of said rotary table to bring said disengageable fine adjustment drive into engaged condition, an intermediate member swingingly mounted on said support, a connection member connecting said control disc with said intermediate member, and a control member in fixed connection with said intermediate member, manually operable alternately into, a position for having said rotary table released and said disengageable fine adjustment drive in engaged condition, a position for having said rotary table clamped fast and said disengageable fine adjustment drive in engaged condition, and a position for having said rotary table released and said disengageable fine adjustment drive in disengaged condition.

4. In a table arrangement, stationary means, a table rotatably mounted on said stationary means, a rotary control disc supported on said stationary means to be rotatable about the rotary axis of said table, a transmission means mounted on said stationary means, engaging said control disc, an axially adjustable clamping member with its axis parallel to the rotary axis of said table, controllable for axial movement by said transmission means and arranged to temporarily clamp fast said table on said stationary means, a resilient means engaging said clamping member to act on the latter parallel to the rotary axis of said table for holding said clamping member engaged with said table in clamping position, a disengageable fine adjustment drive for said table, comprising an axially adjustable coupling member with its axis parallel to the rotary axis of said table, controllable for axial movement by said control disc, a coupling resilient means engaging said coupling member to act on it parallel to the rotary axis of said table to bring said disengageable fine adjustment drive into engaged condition, drive means coupled with said rotary control disc, and a control member coupled with said drive means, manually operable into several positions to effect clamping and releasing said table and engaging and disengaging said disengageable fine adjustment drive.

5. In a table arrangement, stationary means, a table rotatably mounted on said stationary means, a control member movably supported on said stationary means, an axially adjustable securing means with its axis parallel to the rotary axis of said table, arranged to temporarily hold fast said table, a resilient means engaging said securing means to act on the latter parallel to the rotary axis of said table for holding said securing means engaged with said table in securing position, transmission means in operable relation with said control member and said securing means to axially adjust said securing means, a disengageable fine adjustment drive for said table, comprising an axially adjustable coupling means with its axis parallel to the rotary axis of said table, controllable for axial movement by said control member, a coupling resilient means engaging said coupling means to act on it parallel to the rotary axis of said table to bring said disengageable fine adjustment drive into engaged condition, drive means coupled with said control member, and a control means coupled with said drive means, manually operable into several positions to effect securing and releasing said table and engaging and disengaging said disengageable fine adjustment drive.

References Cited in the file of this patent

UNITED STATES PATENTS

| | | |
|---|---|---|
| 2,086,850 | Bullard | July 13, 1937 |
| 2,465,497 | Turrettini | Mar. 29, 1949 |
| 2,748,624 | Costello | June 5, 1956 |
| 2,771,169 | Wahlstrom | Nov. 20, 1956 |